United States Patent [19]

Williamson

[11] Patent Number: 4,635,505
[45] Date of Patent: Jan. 13, 1987

[54] AXLE-CONTROLLED DIFFERENTIAL

[76] Inventor: Archie O. Williamson, 5916 S. Halifax Ave., Edina, Minn. 55424

[21] Appl. No.: 742,806

[22] Filed: Jun. 10, 1985

[51] Int. Cl.$^4$ .......................... F16H 1/40; F16H 1/44
[52] U.S. Cl. ........................................ 74/713; 74/711
[58] Field of Search ............... 74/711, 710.5, 713, 74/417, 416, 424, 202, 206, 214, 690

[56] References Cited

U.S. PATENT DOCUMENTS

| | | | |
|---|---|---|---|
| 1,113,305 | 10/1914 | Brown | 74/713 |
| 1,235,249 | 7/1917 | Salfisberg | 74/713 X |
| 1,239,990 | 9/1917 | Ware | 74/713 |
| 1,886,668 | 11/1932 | Gabli | 74/710 |
| 2,671,358 | 3/1954 | Johnston | 74/711 |
| 3,385,133 | 5/1968 | Terao | 74/713 X |
| 4,224,839 | 9/1980 | von Kaler | 74/713 |

FOREIGN PATENT DOCUMENTS 721707 11/1966 Italy .................................. 74/710.5

OTHER PUBLICATIONS

Motors Auto Repair Manual, 1973, unnumbered page.
The Way Things Work, 1967, p. 501.
Van Nostrand's Scientific Encyclopedia, 1976, 2 unnumbered pages.
Mark's Mechanical Engineers Handbook, 1958, 8-10-3-8-104, 11-12.
Popular Science, Feb. 1984, pp. 58-61.
Motor Trend, Jun. 1985, p. 151.

Primary Examiner—Leslie A. Braun
Assistant Examiner—D. Wright
Attorney, Agent, or Firm—Merchant, Gould, Smith, Edell, Welter & Schmidt

[57] ABSTRACT

An improved non-slip differential (10) includes a case (12) with a rotatable control shaft (52) supporting a pair of offset bevel gears (50) which are coupled via U-joints (62) to output shafts (48). A pinion gear (64b) is set at an obtuse angle between the bevel gears (50) such that neither bevel gear and corresponding output shaft (48) can be driven to the exclusion of the other. Another pinion gear (64a) set at an acute angle relative to the bevel gears (50) is preferably included for additional load distribution between the bevel gears. A second embodiment (80) incorporates non-toothed bevels (82) and pinions (84a and 84b) in frictional engagement.

21 Claims, 4 Drawing Figures

AXLE-CONTROLLED DIFFERENTIAL

TECHNICAL FIELD

The present invention relates generally to drive train components, and more particularly relates to an improved differential for positively applying power from a drive shaft to a pair of driven shafts.

BACKGROUND ART

During maneuvering, it may be necessary for the wheels on opposite sides of a vehicle to rotate at different rates or even in opposite directions. For example, as a four-wheel vehicle rounds a curve, the outer wheels travel a greater distance and therefore must turn faster than the inner wheels. Maneuvering in tight quarters can cause opposing wheels to turn in opposite directions. This presents no difficulties if the wheels are either driven independently or mounted on a dead axle for independent rotation, however, with a live axle some compensation is necessary to permit the wheels to turn at different speeds.

Differentials or differential gearing have long been utilized for distributing power between the wheels while permitting one wheel to turn faster than the other, as needed on curves. The differentials of the prior art typically include a ring gear driven by a pinion gear mounted on the drive shaft. The ring gear is secured to a differential case or housing which rotates therewith. Each axle includes a coaxial bevel gear which meshes at right angles with pinions mounted on spindles within the differential case. When traveling straight ahead, the differential case simply rotates with the ring gear, and there is no relative motion between the pinion and bevel gears therein. When rounding a curve, however, one wheel must travel relatively faster, and the difference in rotation of the axles is compensated for by the pinion gears which permit opposite relative rotation of the bevel gears as the bevel gears are being driven by the differential case such that faster rotation of one axle and wheel is offset by proportionately slower rotation of the other axle and corresponding wheel.

The major disadvantage of conventional differentials has been that all traction can be applied to one axle to the exclusion of the other. That is, if one wheel is slipping on ice or mud while the other wheel is resting on dry pavement, the differential case and pinion gears therein simply turn around the stationary bevel gear for the axle of the wheel with traction on dry pavement while the bevel gear for the axle secured to the wheel on ice spins. The differential thus completely controls the power distributed to the axles and, under certain conditions, all power can be expended on one axle without driving the vehicle.

Various positive or so-called non-slip differentials have been developed to overcome this problem, however, the positive differentials of the prior art have been unnecessarily complex and thus expensive. One of the most popular non-slip differentials of the prior art operates only in forward gear but not in reverse.

There is thus a need for an improved positive differential whereby traction can be applied, regardless of direction, to the other axle if one axle should slip so that neither axle can be driven alone.

SUMMARY OF THE INVENTION

The present invention comprises an improved differential which overcomes the foregoing and other difficulties associated with the prior art.

In accordance with one embodiment of the invention, there is provided an axle-controlled differential including a case supported for rotation responsive to drive of an input shaft. A pair of pinion gears of different sizes are supported on a straight shaft between a pair of bevel gears supported on a control shaft, within the case. The bevel and pinion gears are not set at right angles to each other, but are slightly offset from the center line of the wheel axles so as to achieve a controlled wedging action due to their free floating center control shaft so that the axles connected thereto are driven in unison even if one of the axles should attempt to slip. A universal joint can be coupled between each axle and corresponding bevel gear in the differential case to permit the offset of the bevel and pinion gears so that the bevels are set at an acute angle with respect to one pinion and are set at an obtuse angle relative to the other pinion. These bevel gears are totally controlled by a free floating "bent" control shaft. This control shaft, however, revolves on the unit's wheel center line which means, viz; opposing wheels can rotate freely in opposite directions. However, one wheel cannot stand still while its opposite wheel rotates because the control shaft dictates their movement must be together or opposite.

A second inventive embodiment incorporates bevels and pinions in frictional instead of meshed engagement.

BRIEF DESCRIPTION OF DRAWING

A better understanding of the invention can be had by reference to the following Detailed Description in conjunction with the accompanying Drawing, wherein.

DETAILED DESCRIPTION

Figure 1:
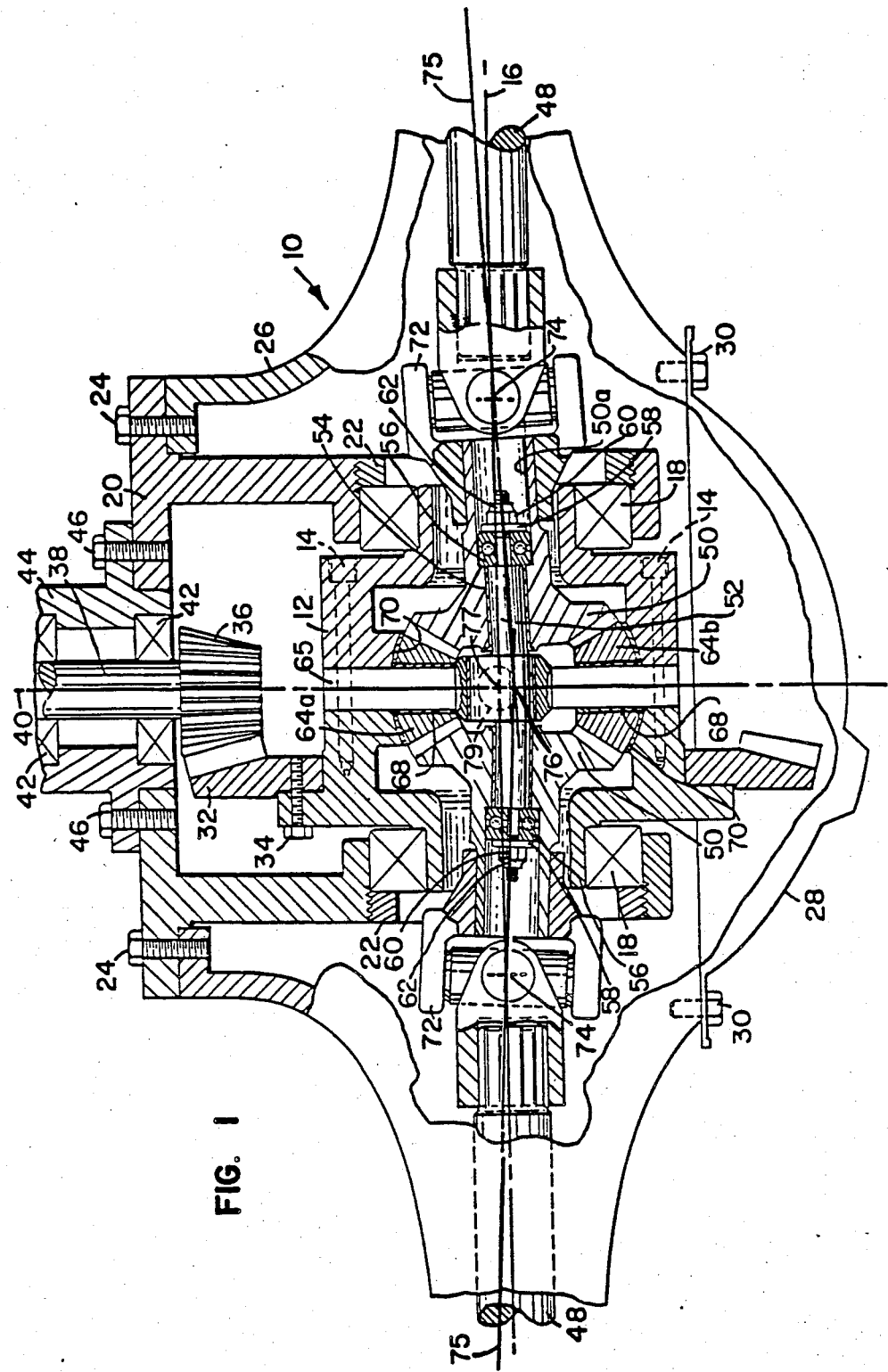
FIG. 1 is a sectional view of the differential incorporating a first embodiment of the invention.
Figure 2:
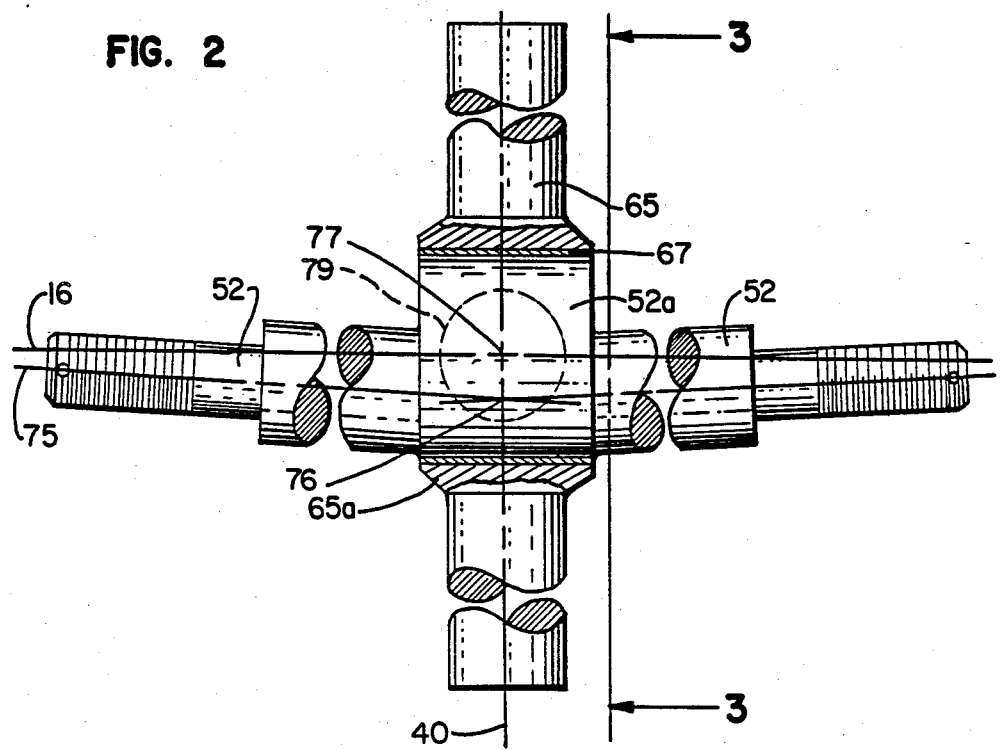
FIG. 2 is an enlarged view of the control shaft which supports the bevels, but which is supported for rotation by the idler shaft supporting the pinions.
Figure 3:
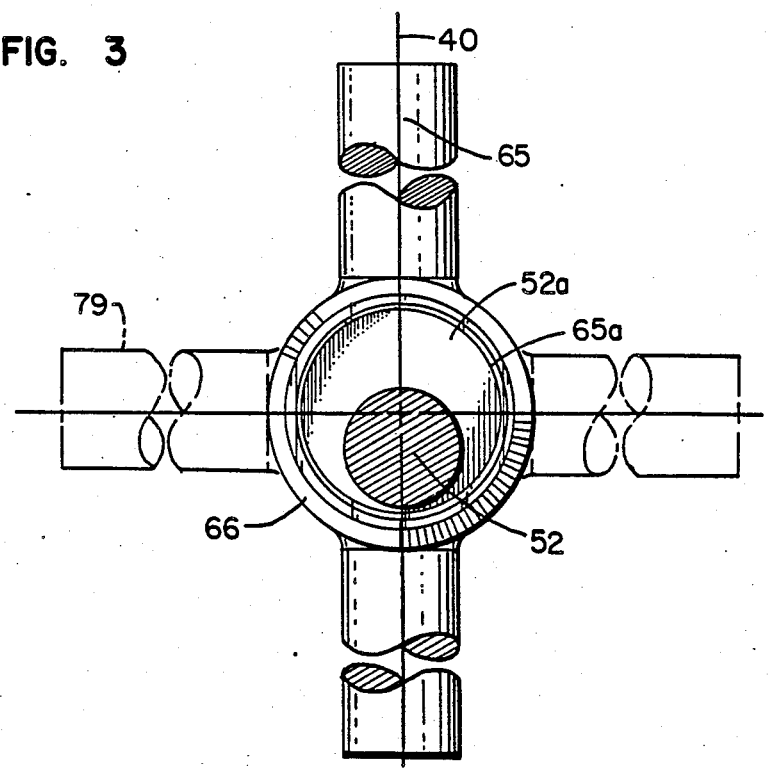
FIG. 3 is a side view of the subassembly shown in FIG. 2.

Referring now to the Drawing, wherein like reference numerals designate like or corresponding components throughout the views, and particularly referring to FIGS. 1-3, there is shown a differential 10 incorporating the first embodiment of the invention. The differential 10 of the invention as shown is an axle-type differential which is particularly adapted for use in automotive applications, including both two-wheel and four-wheel drive vehicles; however; the invention can be utilized in any application wherein it is desired to divide power from an input shaft between two output shafts subject to different load and rotational conditions. As will be explained more fully hereinafter, differential 10 is an axle-controlled differential whereby power from the input shaft is divided between the two output shafts under all conditions such that neither output shaft can be driven alone to the exclusion of the other output shaft.

Differential 10 includes several components which are substantially similar in construction and function to some components in the differentials of the prior art. Differential 10 includes a case 12 which is shown as being of split construction with the two portions thereof interconnected by bolts 14. Case 12 is supported for rotation about a generally transverse axis 16 between a pair of bearings 18 which in turn are mounted on a pair of corresponding arms of a bearing carrier 20. Retaining rings 22 secure bearings 18 and the differential case 12 carried thereby in place on the bearing carrier 20. Carrier 20 in turn is secured by bolts 24 or other suitable fasteners to one end of a housing 26 which encloses the case 12. A removable cover 28 is secured to the opposite end of housing 26 by bolts 30.

Means are provided for driving the differential case 12. As illustrated, a circular crown or ring gear 32 surrounds case 12 and is secured thereto for rotation by means of suitable fasteners such as bolts 34, only one of which is shown. A pinion gear 36, which is secured to the end of an input shaft 38, is meshed with the ring gear 32 for driving engagement of case 12. Input shaft 38 is supported for rotation about a generally longitudinal axis 40 by a pair of bearings 42 mounted on a collar 44 attached by bolts 46 to the bearing carrier 20. The input shaft 38, which is typically connected to an engine or motor via a transmission, drives ring gear 32 and thus causes rotation of the differential case 12. Case 13 can also be driven by other means, such as by a chain-and-sprocket arrangement, belt-and-pulley arrangement, spur gears, etc. The particular manner in which case 12 is driven is not critical to practice of the invention.

A pair of output shafts 48 extend outwardly along the axis 16 from opposite sides of the differential case 12. The inner end of each output shaft 48 is secured to a bevel 50 which is rotatably supported in the differential case 12. In particular, the bevels 50 are rotatably mounted in offset relationship on opposing inclined ends of a "bent" control shaft 52. Control shaft 52 includes an integral enlarged circular portion 52a between the opposing inclined shaft ends. Bevels 50 are preferably of equal size. Bushings 54 are preferably provided between bevels 50 and shaft 52, and each bevel is held in place on the corresponding end of the control shaft by a thrust bearing 56, washer 58, nut 60, and cotter pin 62. The bevels 50 are thus supported for rotation in fixed predetermined angular relationship by control shaft 52, which itself is supported for free rotation within case 12.

Bevels 50 in turn are engaged with pinions 64a and 64b which are rotatably supported by a straight idler shaft 65 clamped or otherwise secured within the differential case 12. An integral sleeve or hollow center portion 65a is provided on shaft 65. As is best seen in FIGS. 2 and 3, the center portion 52a of the control shaft 52 is supported within the center portion 65a of shaft 65 for rotation about the transverse axis 16. Bevels 50 are supported in fixed offset position on control shaft 52, which is rotatably supported through idler shaft 65 within casing 12. A bushing 67 is preferably provided between the inner and outer portions 52a and 65a. Similarly, bushings 68 are preferably provided between pinions 64a and 64b and pin 65, while bellevue washers 70 functioning as thrust bearings are provided between the pinions and the differential case 12. As illustrated, bevels 50 and pinions 64a and 64b include cooperating teeth thereon which mesh together in driving engagement.

If desired, a second idler shaft 79 as shown in phantom lines can be utilized together with shaft 65 for reinforcement.

Bevels 50 and pinions 64a and 64b are thus supported within the differential case 12 for rotation therewith but are also rotatable relative to each other. Assume that differential 10 is part of the drive system of a vehicle. When the vehicle is moving straight ahead, the differential case 12 rotates while bevels 50 and pinions 64a and 64b turning therewith do not rotate relative to each other such that both output shafts 48 are driven at the same rotational speed. When rounding a curve, however, one output shaft 48 must turn relatively faster than the other. This differential motion is compensated for in the well-known manner by relative motion between bevels 50 and pinions 64a and 64b within the revolving case 12 such that a higher rotational speed on one side is offset by a proportionately slower rotational speed on the other side.

In contrast to the differentials of the prior art, however, bevels 50 of differential 10 are not coaxial with axis 16 but are offset therefrom for achieving a wedging action between pinion 64b and bevels 50 that prevents drive of one output shaft 48 to the exclusion of the other. A U-joint 72 is coupled between each output shaft 48 and corresponding bevel 50. As illustrated, the outside end of each universal joint 62 is secured to its corresponding output shaft 48, while the inside end thereof is also secured to the stub end 50a of the corresponding adjacent bevel 50. As shown, spline connections are utilized between the U-joints 72, stub ends 50a, and output shafts 48; however, key-andslot arrangements or other suitable connections could be utilized.

The mutually perpendicular axes defined by each universal joint 72 intersect at a point 74 which lies on axis 16. Each bevel 50 is thus rotatable about an offset axis 75, defined by the associated inclined end of control shaft 52, intersecting point 74 on axis 16 and a common focal point 76, which is on longitudinal axis 40 but offset from the lateral axis. Point 77 represents the intersection of longitudinal axis 40 and lateral axis 16. The pitch surfaces of bevels 50 and pinions 64a and 64b thus also intersect at focal point 76. As illustrated, axes 75 are offset about three degrees from axis 16, however, any suitable offset angle can be utilized, and it wil be appreciated that the amount of offset feasible for pinions and bevels of a given size is determined by the distance universal joints 782 can be located away from differential case 12 within the dimensional constraints of the particular application. Bevels 50 are thus set at an acute angle with respect to one pinion 64a, which is the pinion located relatively closer to axis 16, and are also set at an obtuse angle relative to the other pinion 64b farther from the lateral axis.

The offset of bevels 50 within case 12 means that the relatively larger pinion 64b can only revolve freely within the case when both bevels rotate in opposite directions, which means an axle-controlled as opposed to a differential-controlled, axle. Bevels 50 are rotatably supported by control shaft 52 in fixed angular position relative to each other within case 12. Pinion 64b thus cannot move from its position at the maximum spacing to the minimum spacing between bevels 50, and pinion 64b therefore does not rotate unless axle shafts 48 and bevels 50 turn at different rates during vehicle maneuvering. This comprises a significant feature of the invention.

Differential 10 functions in the well-known manner when the vehicle is traveling straight ahead or rounding a curve, applying equal or differential drive to the output shafts 48 as necessary; however, the advantages of the invention are particularly evident when one of the output shafts is experiencing little or no traction. For example, in an automotive application where one shaft 48 is coupled to a slipping wheel on mud or ice while the other shaft is coupled to a wheel with good traction on dry pavement, all of the driving power would be channeled by an ordinary differential to the slipping wheel because its corresponding bevel and the pinions would simply run around the other bevel during rotation of the differential case. Although non-slip differential have been developed heretofore, the differential 10 of the invention accomplishes this in a less complicated fashion by the provision of U-joints 72, permitting offset of the bevels 50 on the angled control shaft 52. Since bevels 50 are mounted at acute and obtuse angles with respect to their mating pinions 64a and 64b, a wedging action takes place between the bevels and the pinion 64b due to floating control shaft 52, which prevents uncontrolled rotation of one bevel relative to the other under such conditions. That is, even though the first bevel 50 connected to the slipping wheel attempts to turn the pinion 64b past the second bevel, the geometry and pitch surfaces are such that the first bevel is constrained against such by a wedging action whereby the second bevel is carried along with the first bevel in positive engagement as control shaft 52 dictates opposite equal rotation or uni-directional rotation together. In other words, even though the pinion 64b attempts to accommodate the slipping wheel by its turning against the bevel 50 of the nonslipping wheel, wedging occurs as case 12 attempts to carry the larger pinion 64b into rolling wedged engagement between the closer portions of bevels 50 such that the larger pinion cannot rotate, thereby "locking up" the differential. Bevels 50 of the differential 10 herein must therefore rotate and be driven in unison in the same direction but can still rotate on control shaft 52 in opposite directions against pinions 64a and 64b such as during tight maneuvering by the wheel axle shafts 48. In this regard, it is noted that the pinion 64a does not contribute to this wedging effect but does provide for additional load distribution between the driven bevels 50 and output shafts 48. Differential 10 thus functions as an axle-controlled differential whereby drive of the non-slipping axle is controlled by the slipping axle, not the differential.

Figure 4:
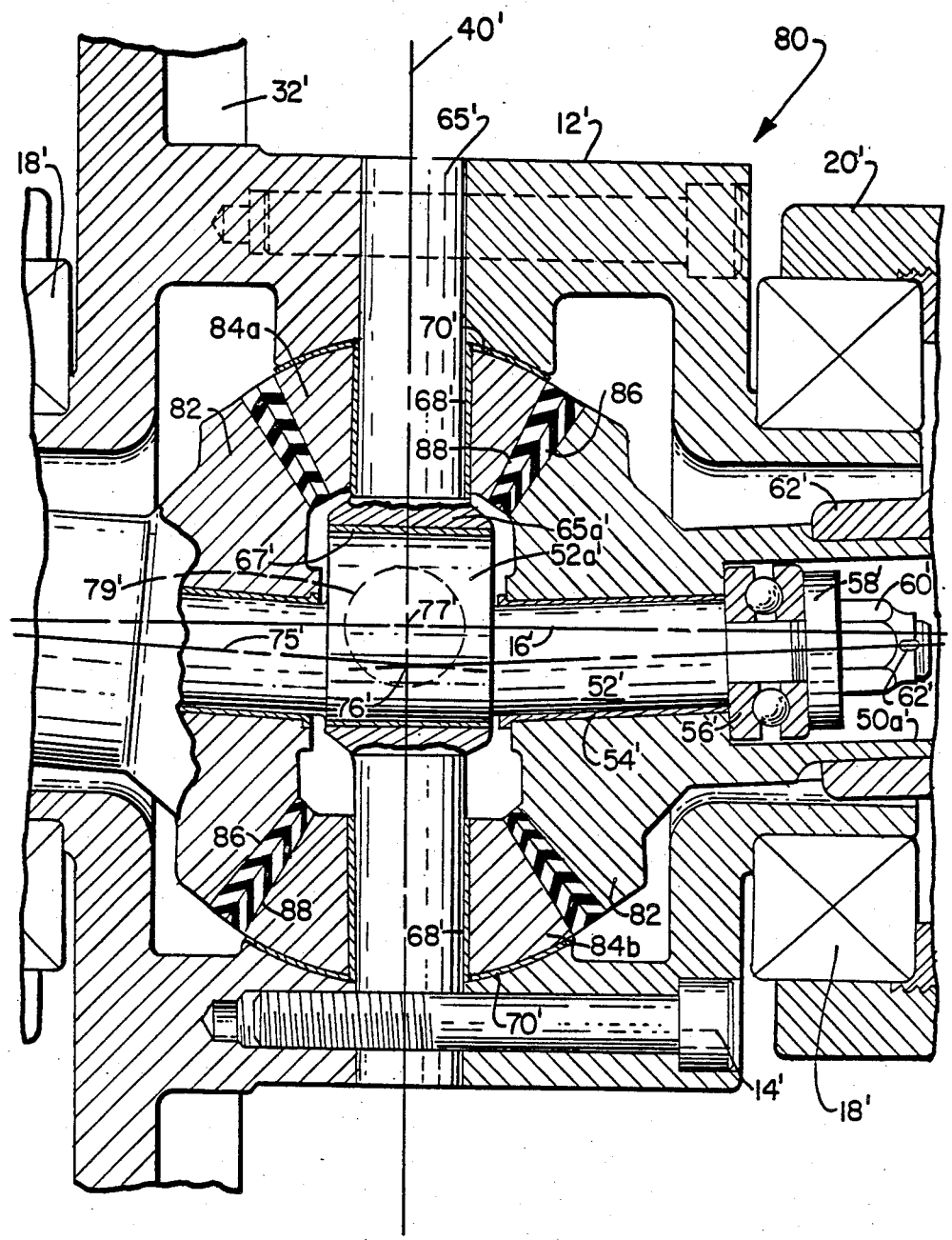
FIG. 4 is an enlarged partial sectional view showing differential incorporating the second embodiment of the invention.

A second embodiment 80 of the differential incorporating the invention is shown in FIG. 4. Differential 80 includes numerous components which are substantially similar in construction and function to components of differential 10 shown in FIG. 1. Such identical components are identified in FIG. 2 with the same reference numerals utilized in the description of differential 10, but are distinguished therefrom with a prime (') notation.

The primary distinction comprises the fact that differential 80 utilizes bevels 82 and pinions 84a and 84b which are adapted for frictional as opposed to toothed or meshed engagement. As illustrated, the corporating surfaces of bevels 82 and pinions 84a and 84b are preferably coated with layers 86 and 88 of suitable non-slip material, such as an elastomeric material for example, and are held together in positive loaded engagement by nuts 60'; however, it will be appreciated that pinions and bevels with any suitable type of surfaces in direct contact could also be utilized. Differential 80 is primarily intended for use in light duty applications but otherwise functions similarly to and with the same advantages as differential 10 of the first embodiment.

From the foregoing, it will thus be apparent that the present invention comprises an axle-controlled differential having numerous advantages over the prior art. Either embodiment of the differential herein achieves positive application of power from the input shaft to the output shafts under all conditions without the complication and expense which have characterized the non-slip differentials of the prior art. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, modifications, and rearrangements and/or substitutions of elements falling within the scope of the invention as defined by the following Claims.

What is claimed is:

1. In a differential of the type including a driven case supporting a rotatable pinion engaged between opposing bevels for driving respective output shafts, the case and output shafts being rotatable about a common transverse axis, the improvement comprising:
   a universal joint coupled between each output shaft and corresponding bevel; and
   a control shaft supported for free rotation within said case about the transverse axis, said control shaft including opposite inclined ends defining offset axes extending through the corresponding universal joints and a common focal point positioned a predetermined distance away from the transverse axis;
   said bevels being rotatably supported on the ends of said control shaft in fixed predetermined relationship offset from the transverse axis so that the spacing between said bevels varies between a predetermined minimum and maximum in accordance with circumferential position, with said pinion being engaged between said bevels at the maximum spacing therebetween, whereby said bevels enable differential drive but are constrained by said pinion and said control shaft against uncontrolled relative rotation such that one bevel and corresponding output shaft cannot be driven to the exclusion of the other bevel and corresponding output shaft.

2. The differential of claim 1, wherein said bevels and pinion are of toothed configurations in meshed engagement.

3. The differential of claim 1, wherein said bevels and pinion are of non-toothed configurations in frictional engagement.

4. The differential of claim 1, wherein said control shaft includes a solid center portion between the inclined ends, and further including:
   an idler shaft including a hollow center portin and at least two opposing ends fixed within said case, the center portion of said idler shaft rotatably supporting the center portion of said control shaft.

5. A positive differential, which comprises:
   a case supported for rotation about a transverse axis;
   means for effecting rotation of said case;
   a pair of output shafts extending outwardly from opposite sides of said case;

a generally transverse control shaft supported within said case for rotation about the transverse axis, said control shaft including opposite inclined ends defining offset axes extending through points positioned predetermined equal distances laterally outward along the transverse axis toward the respective output shafts and through a common focal point positioned a predetermined distance off the transverse axis;

a pair of bevels rotatably supported in opposing angled relationship on the ends of said control shaft;

said bevels being rotatable about the offset axes defined by the ends of said control shaft so that the spacing between said bevels varies between a predetermined minimum and a predetermined maximum in accordance with circumferential position;

a universal joint coupled between each output shaft and corresponding bevel; and a first pinion rotatably supported on said case and engaged between said bevels at the maximum spacing therebetween such that said pinion permits relative rotation of said bevels for differential drive, but becomes wedged between said bevels if one bevel attempts to remain stationary relative to the other bevel, to effect positive interlocking drive of both output shafts.

6. The positive differential of claim 5, wherein said means for effecting rotation of said case comprises:
a drive pinion engaged with said ring gear; and
an input shaft connected to said drive pinion.

7. The positive differential of claim 5, wherein said bevels and said pinion include teeth thereon in meshed engagement.

8. The positive differential of claim 5, wherein said bevels and said pinion are of non-toothed configurations in frictional engagement.

9. The positive differential of claim 5, further including:
a second pinion rotatably supported on said case and engaged between said bevels at the minimum spacing therebetween, opposite said first pinion.

10. A positive differential, which comprises:
a case supported for rotation about a transverse axis;
means for effecting rotation of said case;
a pair of output shafts extending outwardly from opposite sides of said case;
a control shaft including a solid center portion and opposing inclined ends defining offset axes extending through points positioned predetermined equal distances laterally outward along the transverse axis toward the respective output shafts and through a common focal point positioned a predetermined distance off the transverse axis;
means including a hollow center portion fixed to said case for supporting the center portion of said control shaft within said case for rotation about the transverse axis;
a pair of bevel gears rotatably supported in opposing angled relationship on the ends of said control shaft;
said bevel gears being offset from the transverse axis and rotatable on the ends of said control shaft so that the spacing between said bevels varies between a predetermined minimum and a predetermined maximum in accordance with circumferential position;
a universal joint coupled between each output shaft and corresponding bevel gear; and
a pinion gear rotatably supported on said case in meshed engagement between said bevel gears at the maximum spacing therebetween, such that said pinion gear permits relative rotation of said bevel gears for differential drive of said output shafts, but constrains each bevel gear by wedging action against uncontrolled rotation relative to the other bevel gear for positive drive.

11. The positive differential of claim 10, wherein the rotational axis of each bevel gear is offset about three degrees from the transverse axis.

12. The positive differential of Claim 10, further including:
a second pinion gear rotatably supported on said case in meshed engagement between said bevel gears at the minimum spacing therebetween, opposite said first pinion gear.

13. A positive differential, which comprises:
a case supported for rotation about a transverse axis;
means for effecting rotation of said case;
a pair of output shafts extending outwardly from opposite sides of said case;
a control shaft including a solid center portion and opposing inclined ends defining offset axes extending through points positioned predetermined equal distances laterally outward along the transverse axis toward the respective output shafts and through a common focal point positioned a predetermined distance off the transverse axis;
means including a hollow center portion fixed to said case for supporting the center portion of said control shaft within said case for rotation about the transverse axis;
a pair of non-toothed bevels rotatably supported in opposing angled relationship on the ends of said control shaft;
said non-toothed bevels being offset from the transverse axis and rotatable on the ends of said control shaft so that the spacing between said bevels varies circumferentially between a predetermined minimum and a predetermined maximum in accordance with circumferential position;
a universal joint coupled between each output shaft and corresponding non-toothed bevel; and
a non-toothed pinion rotatably supported on one end of said idler shaft in frictional engagement between said bevels at the maximum spacing therebetween such that said pinion permits relative rotation of said bevels for differential drive of said output shafts, but constrains each bevel by wedging action against uncontrolled rotation relation to the other bevel for positive drive.

14. The positive differential of claim 13, wherein the rotational axis of each bevel gear is offset about three degrees from the transverse axis.

15. The positive differential of claim 13, further including:
a second pinion rotatably supported on the other end of said idler shaft in frictional engagement between said bevels at the minimum spacing therebetween, opposite said first pinion.

16. The positive differential of claim 13, further including:
coatings of non-slip material on confronting surfaces of said pinion and bevels.

17. A positive differential, which comprises:
a case supported for rotation about a transverse axis;
means for effecting rotation of said case;

a pair of output shafts extending outwardly from opposite sides of said case;

a pair of rotatable bevels positioned between said output shafts within said case;

control means for supporting said bevels in opposing predetermined angled relation in said case for separate rotation about offset axes extending through points postioned predetermined equal distances laterally outward along the transverse axis toward the respective output shafts and through a common focal point positioned a predetermined distance off the transverse axis, as well as common rotation about the transverse axis, so that the spacing between said bevels varies between a predetermined minimum and a predetermined maximum in accordance with circumferential position;

a universal joint coupled between each output shaft and corresponding bevel; and a first pinion rotatably supported on said case and engaged between said bevels at the maximum spacing therebetween so that said pinion permits relative rotation of said bevels for differential drive, but becomes wedged between said bevels if one bevel attempts to remain stationary relative to the other bevel, to effect positive interlocking drive of both output shafts.

18. The differential of claim 17, wherein said bevels and said first pinion are of toothed configurations in meshed engagement.

19. The differential of claim 17, wherein said bevels and said first pinion are of non-toothed configurations in frictional engagement.

20. The positive differential of claim 17, wherein said bevel control/supporting means comprises:

a control shaft including a solid center portion and opposing inclined ends centered on the offset axes; and an idler shaft including a hollow center portion and opposing ends fixed to said case, the center portion of said idler shaft supporting the center portion of said control shaft for rotation about the transverse axis.

21. The positive differential of claim 17, further including:

a second pinion rotatably supported on said case and engaged between said bevels at the minimum spacing therebetween, opposite said first pinion.

* * * * *